(12) United States Patent
Nakajima et al.

(10) Patent No.: US 6,388,050 B1
(45) Date of Patent: May 14, 2002

(54) METHOD FOR TREATING THERMOPLASTIC RESIN COMPOSITION CONTAINING FLAME RETARDANT

(75) Inventors: Keizo Nakajima, Kawachinagano; Tetsuji Kawakami, Katano; Takayoshi Ueno; Hiroshi Onishi, both of Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/807,693

(22) PCT Filed: Sep. 14, 2000

(86) PCT No.: PCT/JP00/06336

§ 371 Date: Apr. 17, 2001

§ 102(e) Date: Apr. 17, 2001

(87) PCT Pub. No.: WO01/21694

PCT Pub. Date: Mar. 14, 2001

(30) Foreign Application Priority Data

Sep. 17, 1999 (JP) ............................................ 11-262972
Oct. 22, 1999 (JP) ............................................ 11-300979

(51) Int. Cl.$^7$ .................................................. C08F 6/00
(52) U.S. Cl. ...................................................... 528/480
(58) Field of Search ......................................... 528/480

(56) References Cited

FOREIGN PATENT DOCUMENTS

| EP | 0 818 474 | 1/1998 |
|---|---|---|
| EP | 0 949 293 | 10/1999 |
| JP | 7-214028 | 8/1995 |
| JP | 10-195234 | 7/1998 |
| JP | 2000-117738 | 4/2000 |
| JP | 2000-119440 | 4/2000 |
| JP | 2000-198875 | 7/2000 |

*Primary Examiner*—Terressa M. Boykin
(74) *Attorney, Agent, or Firm*—McDermott, Will & Emery

(57) ABSTRACT

The present specification discloses a method for treating a thermoplastic resin composition containing a flame retardant comprising a dissolving or dispersing step of bringing the thermoplastic resin composition containing a flame retardant into contact with a solvent to dissolve or disperse at least one portion of the flame retardant into the solvent. According to this, a thermoplastic resin composition containing a flame retardant can be easily separated into a flame retardant and a thermoplastic resin in their original states.

7 Claims, No Drawings

METHOD FOR TREATING THERMOPLASTIC RESIN COMPOSITION CONTAINING FLAME RETARDANT

TECHNICAL FIELD

The present invention relates to a treating method for separating a flame retardant and a thermoplastic resin from a thermoplastic resin composition containing a flame retardant, which is used for a cabinet of a monitor in television, computer and the like, for example.

BACKGROUND ART

At present, for a cabinet of a monitor in television, computer and a cabinet for video recorder and the like, thermoplastic resins such as styrene resin, ABS (acrylonitrile-butadiene-styrene) resin and high impact polystyrene resin (copolymer or mixture of polybutadiene and polystyrene) with improved impact resistance are generally used. However, since there is a problem that the thermoplastic resin itself has high flammability, and from the viewpoint of prevention of the spread of the fire during a fire, a thermoplastic resin composition obtained by blending a thermoplastic resin and an agent which provides inflammability, such as a flame retardant and a flame retardant accelerator.

In particular, since a halogen type flame retardant has high flame retardant effect to various thermoplastic resins and the price thereof is low, it is widely used all over the world. Further, among the halogen type flame retardants, a bromide type flame retardant is superior in flame retardant effect to aromatic type resins such as styrene type resin and is used in great amounts for various cabinets and part materials for electric appliances. Therefore, when these electric appliances are wasted, great amounts of thermoplastic resin composition containing bromide type flame retardant are wasted.

In this regard, the resin wastes are treated generally by incineration or landfill and what is reused by heating and melting is only a part of the waste resins. From the viewpoint of preventing natural environment from being destroyed, the reuse by heating and melting is preferable. However, it is difficult to incinerate the resin compositions containing a flame retardant because of the given high inflammability and to treat them.

Further, with the increased consciousness for environmental problem, the harm of the halogenated organic compounds has been pointed out and the use of the halogenated organic compounds is being inhibited. At present, manufacturers using the flame retardant are investigating the changeover to a flame retardant containing no halogenated organic compound such as a phosphorous type compound. However, the inflammability which is given by the phosphorous type compound is lower compared to that given by the halogenated organic compound and the above-mentioned changeover is difficult to be achieved at present.

Further, in recent years, it has been desired to reuse resources, and the reuse of plastic materials has become a global problem. Therefore, it is an important problem to be solved to establish a method for treating and reusing the resin wastes. Particularly, as described above, the treatment and reuse of the resin composition containing a flame retardant is merely grappled with and becomes a great problem.

The present invention is suggested by considering such a situation, and an object thereof is to provide a treating method for separating a flame retardant and a thermoplastic resin from a thermoplastic composition containing a flame retardant.

DISCLOSURE OF INVENTION

The present invention provides a method for treating a thermoplastic resin composition containing a flame retardant comprising a dissolving or dispersing step (a) of bringing a thermoplastic resin composition containing a flame retardant into contact with a solvent to dissolve or disperse at least one portion of the flame retardant into the solvent.

It is effective that the above-mentioned treating method comprises a separating step (b) of separating a solution or a dispersion of the flame retardant after the step (a).

Further, it is effective to comprise a drying step (c) of drying the thermoplastic resin composition from which the flame retardant is separated after the step (b).

In the step (a), it is effective to maintain the temperature of the solvent at not lower than a heat distortion temperature of the thermoplastic resin composition when the thermoplastic resin composition containing a flame retardant is brought into contact with the solvent.

Further, it is effective that the flame retardant is a bromide type flame retardant.

Further, it is effective that thermoplastic resin is a styrene type resin.

Further, it is effective that the solvent is represented by the formula:

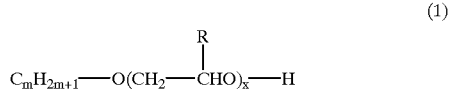

(1)

where R is hydrogen atom or methyl group, m is an integer of 0 to 4, x is an integer of 0 to 3.

BEST MODE FOR CARRYING OUT THE INVENTION

The present inventors have studied whole-heartedly to achieve the above-mentioned object and as a result have found a method for separating a flame retardant from a resin composition by bringing a thermoplastic resin composition containing a flame retardant into contact with a solvent to positively dissolve or disperse the flame retardant component.

Namely, the present invention relates to a method for treating a thermoplastic resin composition containing a flame retardant comprising a dissolving or dispersing step (a) of bringing a thermoplastic resin composition containing a flame retardant into contact with a solvent to dissolve or disperse at least one portion of the flame retardant into said solvent.

The thermoplastic resin composition in the present invention is a composition containing at least a thermoplastic resin and a flame retardant, which provides inflammability. As the other components, a flame retardant accelerator, a stabilizer, a colorant, a flowability reforming agent, release agent and the like may be contained insofar as the effect of the present invention is not decreased according to the uses of the resin composition.

As the flame retardant in the present invention, a flame retardant used in the field of the thermoplastic resin can be employed. For example, it can be exemplified by phenyl oxide type flame retardants such as decabromodiphenyl oxide, octabromodiphenyl oxide and tetrabromodiphenyl oxide, bisphenol A type flame retardants such as tetrabromobisphenol A (TBA), bromide type flame retardants such as hexabromocyclododecane, bis-tribromophenoxyethane, tribromophenol, ethylene bis-tetrabromophthalimide, TBA polycarbonate oligomer, polystyrene bromide and TBA epoxyoligomer, chloride type flame retardants such as chlorinated paraffin, perchlorocyclopentadecane and chlorendic acid, phosphorous type flame retardants, flame retardants containing a nitrogen compound and inorganic flame retardants.

The thermoplastic resin composition may contain one kind of the flame retardant and may contain a plural kinds of the flame retardants. Further, as the content of the flame retardant, there is no particular limitation insofar as the effect of the present invention is not decreased.

On the other hand, as the thermoplastic resin in the present invention, arbitrary one can be used. Among them, in particular, a styrene type thermoplastic resin (thermoplastic resin containing a styrene unit) is particularly effective for the reason that an amount and ratio of the styrene type thermoplastic resin used as an inflammable resin are great.

As this thermoplastic resin, there are, for example, polystyrene, poly-α-methylstyrene, styrene-butadiene copolymer, styrene-acrylonitrile copolymer, styrene-butadiene-acrylonitrile copolymer and styrene-maleic anhydride copolymer.

The thermoplastic resin composition of the present invention may contain one kind of the thermoplastic resins and may contain a plural kinds of thermoplastic resins.

Further, the molecular weight of the thermoplastic resin is not limited insofar as the effect of the present invention is not decreased and is preferably 3,000 to 1,000,000.

Among the bromide type flame retardants, a compound group called as Nondeca type exhibits good solubility to general-purpose solvents. On the other hand, decabromodiphenyloxide (commonly called Decabro) is insoluble to a solvent. According to the present invention, it is possible to separate the flame retardant and the thermoplastic resin by the same treating method regardless of the kind and content of the flame retardant in the resin, which is also an important characteristic of the present invention.

Then, the condition necessary for the solvent used in the dissolving and dispersing step of the treating method of the present invention is that the flame retardant can be dissolved or dispersed relatively easily and that the thermoplastic resin component is not dissolved or difficult to be dissolved. By investigating various solvents, the present inventors found that the glycol ether type compound represented by the formula (1):

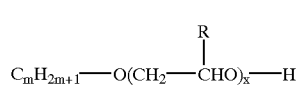

(1)

where R is hydrogen atom or methyl group, m is an integer of 0 to 4, x is an integer of 0 to 3 is most appropriate to the condition. However, since a dialkyl compound of glycol ether type having a methyl group in both terminals dissolves the thermoplastic resin component easily, it is necessary to have a step of separating the flame retardant and the thermoplastic resin again to use the compound for treating the flame retardant with good solubility.

Additionally, the above-mentioned solvent is regarded as preferable because it has a relatively high flash point and is highly safer for the working environment.

As the glycol ether type compound represented by the formula (1), the specific examples are ethylene glycol, diethylene glycol, propylene glycol, dipropylene glycol, diethylene glycol methyl ether, diethylene glycol ethyl ether, diethylene glycol propyl ether, diethylene glycol butyl ether, dipropylene glycol methyl ether, dipropylene glycol ethyl ether, dipropylene glycol propyl ether, dipropylene glycol butyl ether, triethylene glycol methyl ether, triethylene glycol ethyl ether, triethylene glycol propyl ether, triethylene glycol butyl ether, tripropylene glycol methyl ether, tripropylene glycol ethyl ether, tripropylene glycol propyl ether, tripropylene glycol butyl ether.

Further, the higher the content of these glycol ether type compounds in the solvent used in the dissolving and dispersing step of the treating method according to the present invention is, the higher the insolubility particularly to the styrene type resin and the solubility to the flame retardant. Therefore, the solvent used in the present invention preferably contains the glycol ether type compound as the main component, and more preferably, contains it at not less than 50% by weight of the total solvent.

The solvent used in the dissolving and dispersing step of the treating method according to the present invention may contain a known solid or liquid additive on occasion demands to a degree that the dissolving ability of the solvent is not decreased so much. As such additive, there are, for example, antioxidant, antimicrobial/antifungal agent, pest repellent, colorant, foaming agent, surfactant and flowability improver for fine particles.

The solvent can be used repeatedly by performing a distillation operation, and the amount thereof to be used can be suppressed. The flame retardant and the other additives collected as the residues after removing the solvent can be collected without being diffused in the air. Also, since these residues are remarkably small as compared to the initial weight of the total resin composition, they can be handled under a specific control.

As such, according to the present invention, the treatment can be performed with considerations to environment such as appropriate treatment, collection and recycling treatment of environmentally pollutive substances and the reduction of the amount of the solvent to be used.

Hereinbelow, the operations of the method for treating a thermoplastic resin composition containing a flame retardant according to the present invention are explained in detail step by step.

(1) As to the Step (a)

The method for treating a thermoplastic resin composition containing a flame retardant according to the present invention comprises a dissolving or dispersing step (a) of bringing a thermoplastic resin composition containing a flame retardant into contact with a solvent to dissolve or disperse at least one portion of the flame retardant into said solvent. This step is an operation to extract at least one portion of the flame retardant from the thermoplastic resin composition.

As the manner for contacting the thermoplastic resin composition containing a flame retardant and the solvent, there are considered a method A of introducing the thermoplastic resin composition into the solvent to dissolve or disperse the flame retardant into the solvent by stirring, a method B of extracting the flame retardant by disposing a pulverized thermoplastic resin composition onto a filter such as a filter paper, vaporizing, raising, coagulating and dropping the solvent (with the use of a Soxhlet' extractor, for example), and the like.

In the case where the method A is employed, the solvent (extract) with the flame retardant dissolved therein can be separated by filtration and the like.

In the case where the method B is employed, the thermoplastic resin composition and the solvent are in the separated state from the beginning and an extract containing the flame retardant extracted from the thermoplastic resin composition can be obtained directly and, therefore, there is no need to perform a special operation such as the separating step (b) of separating the solvent (extract) with the flame retardant dissolved therein. Also in this case, it is preferable to pulverize the thermoplastic resin composition as finely as possible beforehand to enlarge the contact area with the solvent. Specifically, the thermoplastic resin composition may be made in the form of solid piece by rough pulverization or may be made in the form of powder by further fine pulverization.

Further, the separation of the flame retardant dissolved in the extract and the solvent can be easily performed by conducting the distillation operation.

Further, to positively dissolve the flame retardant into the solvent, it is preferable to maintain the temperature of the solvent at a certain constant temperature, particularly a temperature not lower than the heat distortion temperature of the thermoplastic resin composition. Here, the "heat distortion temperature" means the glass transition temperature (about 90° C.) in a case of polystyrene, for example, and means a temperature at which the form of the thermoplastic resin composition begins to distort. The reason why the "heat distortion temperature" is defined in this manner is that there is a case where the thermoplastic resin composition containing a flame retardant and many other additives has no definite glass transition temperature.

By maintaining it at around this temperature or higher, the softening and distortion of the thermoplastic resin composition is facilitated, and the flame retardant and the other additives present in the thermoplastic resin composition dissolve or disperse into the solvent. Although the thermoplastic resin component does not dissolve into the solvent and solidifies again by being cooled after being maintained at a high temperature for a constant duration time, the once dissolved flame retardant and the other additives are separated without being mixed with the thermoplastic resin.

As a result of the inventors' investigation into the solubilities of the Decabro and the other various additives to the solvent, it has been confirmed that any flame retardant can be dissolved completely by raising the temperature of the solvent to 100 to 150° C. if the concentration of the flame retardant contained in the thermoplastic resin composition is about 5% by weight. Since the flame retardant concentration in the thermoplastic resin composition containing a flame retardant is about 10% by weight generally, it is regarded that the flame retardant can be sufficiently dissolved if the thermoplastic resin composition is treated in the solvent at 10 to 50% by weight. The efficiency of removing the flame retardant is increased if a larger amount of the solvent to the thermoplastic resin composition is used, but the amount of the solvent to be used may be determined by considering the yield of the solvent collection, the cost, the workability and the like.

It is a common case that the thermoplastic resin composition, which is the subject of the treating method according to the present invention, may contain various additives such as a flame retardant accelerator, a stabilizer, a colorant, a flowability improver and a release agent in addition to the flame retardant. In the case where these additives are soluble to the solvent used in the dissolving step (a), they can be extracted by the same dissolution in the step (a).

(2) As to the Step (b)

Then, in the case where, after the thermoplastic resin component is brought into contact with the solvent, immiscible components such as the thermoplastic resin, the non-dissolved flame retardant and the other additives are present in the solvent in addition to the dissolved flame retardant, it is preferable to provide the separating step (b) of separating the solvent with the dissolved flame retardant from the immiscible components as the second step following the step (a).

Also, in the case where the additives with the flame retardant remains in the immiscible components, it is preferable to remove the additive components including the flame retardant from the thermoplastic resin component by bringing the immiscible components into contact with a solvent, into which the additives with the flame retardant can be dissolved or dispersed.

As described above, by the above-mentioned dissolving step (a), various flame retardant and additives contained in the thermoplastic resin composition containing a flame retardant can be separated from the thermoplastic resin component by dissolving or dispersing into the solvent. Then, the thermoplastic resin component can be obtained, from which the flame retardant and the additive component are removed.

Therefore, it is preferable that each of the first dissolving step (a) and the second separating step (b) is conducted one time from the viewpoint of processability, but there is no problem in conducting each step two or more times from the viewpoint of the removal rate, the kind of solvent and the like.

(3) As to the Step (c)

Further, in the present invention, there is a case where the thermoplastic resin composition obtained via the dissolving step (a) and the separating step (b) holds the solvent to some degree and is in the swollen state. In this case, it is difficult to reuse the swollen thermoplastic resin as it is.

Therefore, as the third step, it is further preferable to provide a drying step (c) of drying the thermoplastic resin composition (thermoplastic resin component) from which the additives such as the flame retardant are removed. Here, there is expected a method for removing the solvent by heating, pressurizing and pulverizing the thermoplastic resin containing the solvent.

The collected thermoplastic resin component can be molded again and reused for various products which use a thermoplastic resin, such as a cabinet of TV monitor. It should be noted that although various additives are dissolved and separated in the above-mentioned steps (a) and (b), the component such as colorant may be allowed to remain in a range where it does not influence the recycled thermoplastic resin.

In the following, the method for treating a thermoplastic resin composition containing a flame retardant according to the present invention is explained by examples but is not limited thereto.

EXAMPLE 1

In this example, as a thermoplastic resin composition to be treated, a thermoplastic resin composition containing tetrabromobisphenol A as a flame retardant component and polystyrene (weight-average molecular weight 35,000) as a thermoplastic resin component was prepared in advance, and the separation of the flame retardant and the thermoplastic resin contained in this thermoplastic resin composition was conducted. Herein, the content of the flame retardant was adjusted to 10% by weight of the thermoplastic resin composition.

First, a molded product of the above thermoplastic resin composition (e.g., a defective of TV frame) was roughly pulverized into the form of a block about 5 mm square, and 100 g of the blocks was immersed in a 5% dipropylene glycol methyl ether solution and stirred at room temperature for 2 hours. The thermoplastic resin composition swell slightly, probably because it contained the solvent.

After the stirring was completed, the molecular weight distribution of the thermoplastic resin composition was measured with the use of a GPC apparatus. It was confirmed that the peak of tetrabromobisphenol A decreased to 80% of that had been present before the treatment. Further, when the weight-average molecular weights of polystyrene before and after the treatment were measured, no significant difference was observed in the changes of the molecular weights.

Further, when the dipropylene glycol methyl ether solution used for the treatment was analyzed with the use of a GC-MS apparatus, it was found that the peak of tetrabromobisphenol A was present.

From the above, it was found that the thermoplastic resin did not dissolve into the solvent by using the dipropylene glycol methyl ether solution, but the flame retardant could be dissolved and removed to some extent by stirring at room temperature.

EXAMPLE 2

In this example, as a thermoplastic resin composition to be treated, a thermoplastic resin composition (heat distortion temperature 85° C.) containing tetrabromobisphenol A as a flame retardant component and polystyrene (weight-average molecular weight 35,000) as a thermoplastic resin component was prepared in advance, and the separation of the flame retardant and the thermoplastic resin contained in this thermoplastic resin composition was conducted. Herein, the content of the flame retardant was adjusted to 10% by weight of the thermoplastic resin composition.

First, a molded product of the above thermoplastic resin composition was roughly pulverized into the form of a block about 5 mm square, and 100 g of the blocks was put onto the filter of the extracting tube in a Soxhlet' extractor to conduct the extraction by introducing dipropylene glycol methyl ether (boiling point 190° C.) thereto as the solvent.

After the extracting operation was completed, the extractor was cooled down to room temperature to measure the molecular weight distribution of the component on the filter of the extracting tube. It was confirmed that the peak of tetrabromobisphenol A, which had been present before the treatment, completely disappeared. Further, when the weight-average molecular weights of polystyrene before and after the treatment were examined, no significant difference was observed in the changes of the molecular weights, and it was found that the collected polystyrene could be reused as a raw material.

EXAMPLE 3

In this example, as a thermoplastic resin composition, a thermoplastic resin composition (heat distortion temperature 90° C.) comprising a flame retardant containing isopropyl phenyldiphenyl phosphate as a main component and polystyrene resin (weight-average molecular weight 35,000) was prepared in advance, and the separation of the flame retardant and the thermoplastic resin contained in the thermoplastic resin composition. Herein, the content of the flame retardant was adjusted to 5% by weight of the thermoplastic resin composition.

First, a molded product of the above thermoplastic resin composition was roughly pulverized into the form of a block about 5 mm square, and 100 g of the blocks was put onto the filter of the extracting tube in a Soxhlet' extractor to conduct the extraction by using dipropylene glycol n-propylether (boiling point 212° C.) as the solvent.

After the extracting operation was completed, the extractor was cooled down to room temperature to measure the molecular weight distribution of the component on the filter of the extracting tube. It was confirmed that the peak of the flame retardant, which had been present before the treatment, completely disappeared. Further, when the weight-average molecular weights of the polystyrene before and after the treatment were examined, no significant difference was observed in the changes of the molecular weights, and it was found that the collected polystyrene could be reused as a raw material.

EXAMPLE 4

In this example, as a thermoplastic resin composition, a thermoplastic resin composition (heat distortion temperature 77° C.) comprising a flame retardant containing decabromodiphenyl oxide as a main component and HIPS resin (weight-average molecular weight 36,000) as a thermoplastic resin was used, and the separation of the flame retardant and the resin contained in this thermoplastic resin composition was conducted. Herein, the content of the flame retardant was adjusted to 10% by weight.

First, 100 g of a molded product of the above thermoplastic resin composition, which had been roughly pulverized into the form of a block not greater than 10 mm square, was placed in a container provided with a stirring rod, and 1 litter of tripropylene glycol methyl ether (boiling point 242° C.) was added thereto, and the mixture was heated to 150° C. and kept stirred for 2 hours.

Although the blocks of the molded product were almost uniformly dispersed at a high temperature state, the solid component thereof sedimented when they were allowed to cool to room temperature while being stirred after the heating was completed. When the liquid component and the solid component were separated and the respective molecular weight distributions thereof were measured, it was found that the liquid component contained the flame retardant and the solid component was the HIPS from which the flame retardant was separated. Further, when the changes of the weight-average molecular weights of the separated HIPS resin before and after the treatment, was examined, no significant difference was observed in the changes, and it was confirmed that the HIPS resin could be reused as a raw material.

EXAMPLE 5

In this example, as a thermoplastic resin composition, a thermoplastic resin composition (heat distortion temperature 76° C.) comprising a flame retardant containing tetrabromobisphenol A as a main component and a polystyrene resin (weight-average molecular weight 36,000) was used, and the separation of the flame retardant and the thermoplastic resin contained in the thermoplastic resin composition was conducted. Herein, the content of the flame retardant was adjusted to 10% by weight.

First, 200 g of the above thermoplastic resin composition, which had been roughly pulverized into the form of a block not greater than 10 mm square, was placed in a container provided with a stirring rod, 1 litter of dipropylene glycol methyl ether (boiling point 190° C.) was added thereto, and the mixture was heated to 120° C. and kept stirred for 2 hours.

Although the blocks of the molded product were almost uniformly dispersed at a high temperature, the solid component thereof sedimented when they were allowed to cool to room temperature while being stirred after the heating was completed. When the liquid component and the solid component were separated and the respective molecular weight distributions thereof were measured, it was found that the liquid component contained the flame retardant and the solid component was the polystyrene from which the flame retardant was separated. Further, when the changes of the weight-average molecular weight of the separated polystyrene resin before and after the treatment was examined, no significant difference was observed in the changes, and it was confirmed that the polystyrene resin could be reused as a raw material.

EXAMPLE 6

In this example, as a thermoplastic resin composition, a thermoplastic resin composition (heat distortion temperature 77° C.) comprising a flame retardant containing decabromodiphenyl oxide as a main component and polystyrene resin (weight-average molecular weight 36,000) was used, and the separation of the flame retardant and the thermoplastic resin contained in this thermoplastic resin composition was conducted. Herein, the content of the flame retardant was adjusted to 9% by weight.

First, 100 g of the above thermoplastic resin composition, which had been roughly pulverized into the form of a block not greater than 10 mm square, was placed in a container provided with a stirring rod, and 1 liter of dipropylene glycol methyl ether (boiling point 190° C.) was added thereto, and the mixture was heated to 150° C. and kept stirred for 2 hours. Subsequently, it was allowed to cool while being stirred to separate the thermoplastic resin component and the flame retardant component. The polystyrene resin component made in the form of solid was transferred to a centrifugal separator capable of solvent-removal and filtration, and the solvent-removing and drying treatment was carried out at 5,000 rpm for about 30 minutes.

By measuring the molecular weight distribution, it was confirmed that decabromodiphenyl oxide was not present in the dried resin. Further, when the changes of the weight-average molecular weights of the separated and dried polystyrene resin before and after the treatment was examined, no significant difference was observed in the changes, and it was confirmed that the polystyrene resin could be used as a raw material.

EXAMPLE 7

In this example, as a thermoplastic resin composition, a waste material of a HIPS resin composition (containing decabromodiphenyl oxide at about 10% by weight as a flame retardant and also containing additives such as a colorant, a flame retardant accelerator and a release agent) used for the rear cover of a television was prepared.

First, 100 g of the above thermoplastic resin composition, which had been roughly pulverized into the form of a block not greater than 10 mm square, was placed in a container provided with a stirring rod, 1 liter of tripropylene glycol methyl ether (boiling point 242° C.) was added thereto, and the mixture was heated to 150° C. and kept stirred for 2 hours. Subsequently, it was allowed to cool while being stirred to separate the HIPS resin component and the flame retardant component. The HIPS resin component made in the form of solid was transferred to a centrifugal separator capable of solvent-removal and filtration, and the solvent-removing and drying treatment was carried out at 5,000 rpm for about 30 minutes.

By measuring the molecular weight distribution, it was confirmed that decabromodiphenyl oxide was not present in the dried resin. Further, when the changes of the weight-average molecular weights of the dried HIPS resin before and after the treatment was examined, no significant difference was observed in the changes, and it was confirmed that the HIPS resin could be used as a raw material.

EXAMPLE 8

In this example, as a thermoplastic resin composition, a thermoplastic resin composition (heat distortion temperature 90° C.) comprising a flame retardant containing tetrabromobisphenol A as a main component and a polystyrene resin (weight-average molecular weight of 35,000) was prepared, and the separation of the flame retardant and the thermoplastic resin contained in the thermoplastic resin composition was conducted. Herein, the content of the flame retardant was 10% by weight.

First, the above thermoplastic resin composition was roughly pulverized into the form of a block about 5 mm square, and 100 g of the blocks was put onto the filter of the extracting tube in a Soxhlet' extractor to conduct the extraction by using diethylene glycol (boiling point 188° C.) as the solvent.

After the extracting operation was completed, the extractor was cooled down to room temperature, and the molecular weight distribution of the component on the filter of the extracting tube was measured. It was confirmed that the peak of the flame retardant, which had been present before the treatment, completely disappeared. Further, when the weight-average molecular weights of the polystyrene before and after the treatment were examined, no significant difference was observed in the changes of the molecular weights, and it was found that the collected polystyrene could be reused as a raw material.

EXAMPLE 9

In this example, as a thermoplastic resin composition, a thermoplastic resin composition (heat distortion temperature 77° C.) comprising a flame retardant containing decabromodiphenyl oxide as a main component and a HIPS resin (weight-average molecular weight 36,000) was used, and the separation of the flame retardant and the thermoplastic resin contained in this thermoplastic resin composition was conducted. Herein, the content of the flame retardant was adjusted to 10% by weight.

First, 100 g of the above thermoplastic resin composition, which had been roughly pulverized into the form of a block not greater than 10 mm square, was placed in a container provided with a stirring rod, 1 liter of dipropylene glycol (boiling point 233° C.) was added thereto, and the mixture was heated to 180° C. and kept stirred for 2 hours. Subsequently, when it was allowed to cool, the solid component sedimented. The liquid component and the solid component were separated, and when the respective molecular weight distributions thereof were measured, the liquid component contained the flame retardant and the solid component was the HIPS (resin) from which the flame retardant was separated. Further, when the changes of the weight-average molecular weights of the separated HIPS resin before and after the treatment was examined, no significant difference was observed in the changes, and it was confirmed that the HIPS resin could be used as a raw material.

INDUSTRIAL APPLICABILITY

As described above, by using the treating method of the present invention, a thermoplastic resin composition containing a flame retardant, which is considered to be wasted in large volume and become a problem in future, can be easily separated into a flame retardant and a thermoplastic resin in their original states. Further, by recycling the thermoplastic resin, the reduction of waste materials can be achieved while the solvent used for the recycling can also be reused, contributing to the solution of environmental problem, which has been required recently.

What is claimed is:

1. A method for treating a thermoplastic resin composition containing a flame retardant comprising a dissolving or dispersing step (a) of bringing a thermoplastic resin composition containing a flame retardant into contact with a single solvent to dissolve or disperse at least one portion of said flame retardant into said solvent.

2. The method for treating a thermoplastic resin composition containing a flame retardant in accordance with claim 1, comprising a separating step (b) of separating a solution or a dispersion of said flame retardant after said step (a).

3. The method for treating a thermoplastic resin composition containing a flame retardant in accordance with claim 2, comprising a drying step (c) of drying said thermoplastic resin composition from which said flame retardant is separated after said step (b).

4. The method for treating a thermoplastic resin composition containing a flame retardant in accordance with claim 1, wherein the temperature of said solvent is maintained at not lower than a heat distortion temperature of said thermoplastic resin composition when said thermoplastic resin composition containing a flame retardant is brought into contact with said solvent in said step (a).

5. The method for treating a thermoplastic resin composition containing a flame retardant in accordance with claim 1, wherein said flame retardant includes a bromide flame retardant.

6. The method for treating a thermoplastic resin composition containing a flame retardant in accordance with claim 1, wherein said thermoplastic resin is a styrene type resin.

7. The method for treating a thermoplastic resin composition containing a flame retardant in accordance with claim 1, wherein said solvent is represented by the formula:

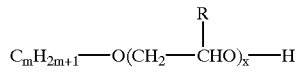

(1)

where R is hydrogen atom or methyl group, m is an integer of 0 to 4, x is an integer of 0 to 3.

* * * * *